Oct. 25, 1949.  E. JESCHKE  2,485,738
INTERMITTENT CLUTCH
Filed May 3, 1946

INVENTOR:
Ernest Jeschke,
BY
Bodell & Thompson
ATTORNEYS.

Patented Oct. 25, 1949

2,485,738

UNITED STATES PATENT OFFICE 2,485,738

INTERMITTENT CLUTCH

Ernest Jeschke, Syracuse, N. Y.

Application May 3, 1946, Serial No. 667,159

2 Claims. (Cl. 74—125.5)

This invention relates to intermittent motion transmitting mechanism or intermittent or periodic clutches, and has for its object a clutch which is particularly simple and compact in construction for transmitting intermittent motion at regular intervals. More specifically, it has for its object a clutch consisting of driving and driven elements or heads opposed to each other, one having a clutch face and the other a shiftable clutch member for coacting with said face, and means which for convenience is called a mask between said elements normally holding the shiftable member out of engagement with the clutch face, with the mask having a cut-out or opening which permits the shiftable clutch member at regular intervals during rotation of the driving element to move into and out of clutching engagement with the driven element and rotate the same a predetermined amount.

The invention further has for its object a mask which is shiftable to vary the amount the driven element is actuated by the driving element during each periodic or intermittent actuation.

The invention consists in the novel features and in the combinations and constructions hereinafter set forth and claimed.

In describing this invention, reference is had to the accompanying drawings in which like characters designate corresponding parts in all the views.

Figure 1:
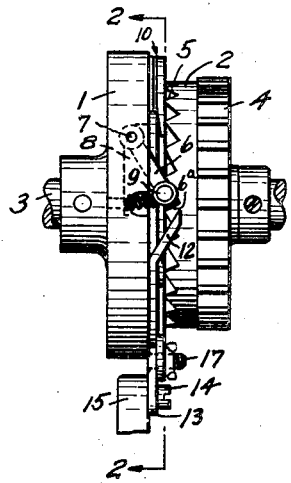
Figure 1 is an elevation of this intermittent motion transmitting mechanism or clutch.
Figure 2:
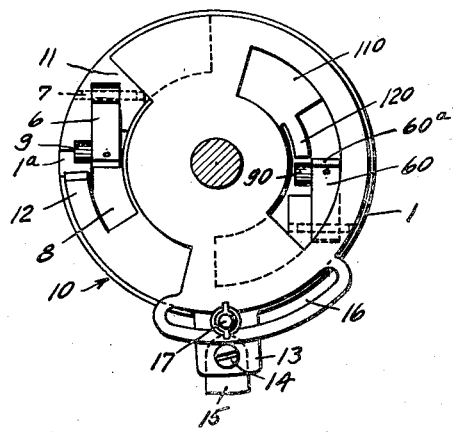
Figure 2 is a sectional view taken on the plane of line 2—2, Figure 1.
Figure 3:
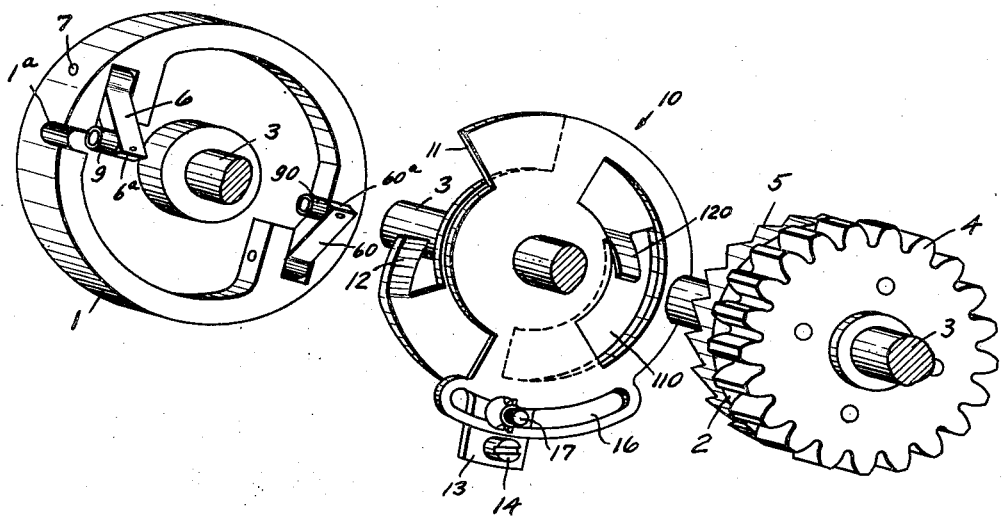
Figure 3 is an exploded view of the clutch.

This clutch includes driving and driven elements, one, as the driven element, having a clutch face, and the other or driving element having a member for coacting with said face, it being urged into engagement with said face, preferably by a spring, and normally held out of engagement with said face by means, as a stationary mask located between the opposing faces of the clutch elements, and having an opening or cut-out therein of predetermined length, which, during rotation of the driving element, permits said member to be shifted by its spring into clutching engagement with the clutch face of the driven element, when the clutch member registers with the cut-out or opening and permits the mask to shift said member out of engagement when said member moves out of register with the opening.

1 designates the driving element, and 2 the driven element, these being shown as mounted on a shaft 3 opposed to each other, the driving element being keyed to the shaft and the driven element mounted to rotate about the shaft. The driven element is here shown as provided with a gear 4 for transmitting the intermittent motion of the clutch element 2. The clutch element 2 is provided with a toothed clutch face 5 on its side opposed to the clutch element 1. The shiftable clutch member is here shown as in the form of a pawl 6 pivoted at 7 in a recess 8 in the driving element 1 and extending in a tangential direction from its pivot. The free end or toothed portion 6ª of the pawl coacts with the clutch face 5. The pawl is provided at its free end with a follower portion, as a roller 9, on one side thereof, the follower being located out of the path or orbit of the toothed end 6ª. The roller moves along a track on the mask.

10 designates the mask, this being composed of discoidal plates formed with a cut-out or opening 11 therein and with a cam 12 at the end of the cut-out or opening 11, with respect to the direction of rotation. The cut-out or opening permits the pawl 6 to move into engagement with the clutch face 5 when the pawl 6 registers with the cut-out or opening 11. The cam 12 shifts the pawl 6 against the action of its spring out of engagement with the clutch face 5 back into the recess 8. The mask is composed of two plates, one lying on the other, one having a radially extending ear or lug 13 anchored at 14 to a fixed part 15 of the frame of the machine in which this clutch is installed, and the other plate 10 having an arcuate slot 16 in its rim extending across the ear 13. The slot is for the purpose of receiving a clamping screw 17 extending through the slot and into the ear 13 to hold the plates of this mask in any circumferentially adjusted position. The adjustment is for the purpose of varying the length of the cut-out or opening 11. During the movement of the roller 9 along the circular full portion or track of the mask, the roller is depressed into a recess 1ª in the driving member 1.

In order to distribute the load or strain, two pawls are provided located diametrically opposite each other, and in this instance, the driving element 1 may actuate the driven element 2 a predetermined amount, once during each rotation of the driving element 1. The cut-out or opening 110 in the mask for the other pawl 60 is spaced a different radial distance from the axis of the shaft 3 from the cut-out 11 and also the cam 120 a different radial distance from the cam 12; likewise the follower or roller 90 is spaced a different distance radially from the roller 9. Thus, the rollers move along inner and outer concentric tracks on the mask 10 with the roller 90 rolling on a track of less diameter than the outer track for the roller 9. The track for the roller 9 extends at 100 outside of the cut-out or opening 110. The engaging toothed ends 6ª and 60ª of the pawls 6 and 60 are, however, of the same radial distance from the axis of the clutch, and hence both engage the clutch face 5 at the same time, but during the rotation of the driving element 1, the roller 9 moving along the outside track, does not permit the pawl to move out of engaged position when passing around the cut-out or opening 110 and the roller 90 passing on the inside track passes the cut-out or opening 11 without moving thereinto. Both pawls, however, will engage the clutch face 5 at the same time or the rollers 9 and 90 will enter their cut-outs or openings 11, 110 in the mask at the same time.

By this arrangement, the rotation of the driving element 1 is transmitted at two diametrically opposite points to the driven element while the driving element is making one revolution.

What I claim is:

1. An intermittent clutch including opposing driving and driven elements, one being provided with a clutch face and the other with a pair of clutch members located on opposite sides of the axis of the clutch and shiftable into and out of coaction with said face, a stationary mask interposed between the opposing faces of said elements and provided with concentric annular tracks of different diameters, one track for each clutch member, the mask being formed with openings of different diameters with which said members register respectively during rotation of the driving element, said clutch members being formed with engaging portions for coacting with said clutch face and with portions running over the tracks respectively and movable through the openings respectively to engage said clutch face, the mask being formed with cams at the ends of the openings with respect to the direction of rotation for coacting with the engaging portions of the clutch members respectively, said cams being arranged different radial distances from the axes of the clutch elements and in line respectively with the tracks, all whereby neither of said members is controlled by the opening and track and cam for the other member.

2. An intermittent clutch including axially alined driving and driven elements, one being provided with a clutch face facing the other element, and said other element being provided with a clutch member shiftable relative thereto in a general direction axially of the driving and driven elements into and out of engagement with said clutch face, a stationary mask extending between the opposing faces of said elements between the clutch face and clutch member and formed with a cut-out with which the clutch member registers during the rotation of the driving and driven elements, and a throw-out cam at the end of the cut-out with respect to the direction of rotation to shift the clutch member out of engaged position, the clutch having a follower movable on the mask and coacting with the cam, the opening interrupting the path of the follower.

ERNEST JESCHKE.

REFERENCES CITED

The following references are of record in the file of this patent:

UNITED STATES PATENTS

| Number | Name | Date |
| --- | --- | --- |
| 2,421,628 | Lake et al. | June 3, 1947 |